UNITED STATES PATENT OFFICE.

DANIEL BROBST, OF MONROE, MICHIGAN.

COMPOSITION FOR COATING ROOFS, &c.

SPECIFICATION forming part of Letters Patent No. 360,949, dated April 12, 1887.

Application filed February 4, 1887. Serial No. 226,557. (No specimens.)

*To all whom it may concern:*

Be it known that I, DANIEL BROBST, a citizen of the United States, residing at Monroe, in the county of Monroe and State of Michigan, have invented a new and useful Improvement in Composition for Coating Roofs, &c., of which the following is a specification.

The invention, which is an improvement on a patent granted to me on the 14th day of April, 1885, No. 315,471, relates to a new composition of matter useful for the preservation of different articles, but principally adapted for painting or coating roofs and for making pavements. The object is to make cheaply a composition of matter that will thoroughly subserve the purposes indicated above.

The composition, when used for shingle-roofs, consists of the following ingredients, in the following proportions: coal-tar, twelve gallons; asphalt, four gallons; pitch, four gallons; iron ore burned with coal or cooked, twelve quarts; Venetian red, twelve pounds; salt, six pounds; alum, four pounds; gypsum, five pounds; cement, (preferably Roman,) eight pounds; sulphur, five pounds; resin, (preferably pine,) five pounds; benzine, one-half gallon; slaked lime, two gallons; tallow, two pounds; copperas, one pound.

In preparing the above composition the slaked lime is placed in a suitable receptacle, its scum removed, and the tallow and copperas added. The coal-tar is then boiled and the asphalt and pitch added, the whole being reduced to a liquid condition. To this the lime, tallow, and copperas, prepared as described above, are added. To this mixture so formed the other ingredients are added in order, the cooked iron ore, Venetian red, and benzine being the last. The composition is then ready for use.

The iron ore is prepared by burning it in layers alternately with layers of hard coal till the whole is reduced to a powdered condition and it is then sifted.

The composition is applied hot upon the shingles, which it penetrates to a certain degree. It also fills up the holes and depressions formed by decay or otherwise, stops small leaks, and makes the roof nearly fire-proof.

The slaked lime and tallow may be omitted, if desired, the result being equally as good for many purposes.

In covering tin or sheet-metal roofs, the salt and alum are omitted, as they have a tendency to cause metal to rust. When put on roofing the compound should be covered with a layer of sharp sand.

In making pavements a bed of cobble-stones and gravel is first prepared. This is covered with a suitably-thick layer of the compound, which is covered with a layer of powdered gypsum and sand. The whole is then properly rolled, and a very fine and durable pavement is produced.

Having described my invention, I claim—

1. The compound, substantially as herein described, consisting of coal-tar, asphalt, pitch, cooked iron ore, Venetian red, salt, alum, gypsum, cement, sulphur, pine resin, benzine, slaked lime, tallow, and copperas, in about the proportions specified.

2. The composition, substantially as herein described, consisting of coal-tar, asphalt, pitch, cooked iron ore, Venetian red, gypsum, cement, sulphur, resin, benzine, and copperas, in about the proportions specified.

3. The composition, substantially as herein described, consisting of coal-tar, asphalt, pitch, cooked iron ore, Venetian red, salt, alum, gypsum, cement, sulphur, pine resin, benzine, and copperas, in about the proportions described.

In testimony that I claim the foregoing as my own I have hereto affixed my signature in presence of two witnesses.

DANIEL BROBST.

Witnesses:
CYRUS WHITLAND,
IRA G. HUMPHREY.